United States Patent Office.

ERASTUS FIELD, OF OSTRANDER, OHIO.

Letters Patent No. 112,329, dated March 7, 1871.

IMPROVEMENT IN MEDICAL COMPOUNDS FOR CURE OF CATARRH AND ASTHMA.

The Schedule referred to in these Letters Patent and making part of the same.

I, ERASTUS FIELD, of Ostrander, in the county of Delaware and State of Ohio, have invented a new and useful medicinal remedy, called Catarrh and Asthma Specific; and I do hereby declare that the following is a full, clear, and exact description thereof, which will enable others skilled in the art to make and use the same.

My invention consists in combining hemp leaves, boneset, lobelia, Virginia snake-root, stramonium leaves, extract of liquorice, gum myrrh, and iodide of potassa with nitrate of potassa and chlorate of potassa in such a way as to effectually cure persons afflicted with asthma and catarrh, as well as other diseases of the lungs and air-passages, by inhalation.

I do not claim that all of the ingredients named are new for the use and purposes set forth.

Stramonium and nitrate of potassa have been used in asthma only, but stramonium has but a palliative effect, and when it is the principal ingredient its use is attended with many unpleasant symptoms, and sometimes attended with danger, from the strong narcotic impression made on the brain.

Nitrate of potassa has also been tried, but is too irritating when used alone, or with stramonium, and many cannot bear it.

They both have a prostrating effect when their use is continued, and they only palliate without curing; but I claim to have invented, by the combination of ingredients, a new, useful, and safe remedy for diseases of the lungs and air-passages, entirely different in its curative results from stramonium alone or any two or three of the ingredients combined.

Herein consists the novelty of my invention.

My compound remedy acts as a stimulant, tonic, alterative, and expectorant. Coming in contact with all the mucous surface of the tubes and air-cells of the lungs, it soothes the diseased surface, changes the secretions, promotes expectoration, and causes, by its alterative effect, the absorption of tubercles, if formed, or prevents their formation.

This result I have attained by an acquaintance with each constituent part, and by a long series of experiments in my own family and on numerous other persons with diseased lungs, after having been engaged in the practice of medicine twenty years.

The ingredients are combined in the following proportions:

I first make a solution as follows: Water, nine pints; nitrate of potassa, eleven ounces; chlorate of potassa, one ounce; extract of liquorice, four ounces.

I prepare the medicine by dissolving the liquorice in the water, having it hot; then add the nitrate of potassa and chlorate of potassa; when all are dissolved and the solution blood-warm, then take by weight boneset leaves, two parts; hemp leaves, one part; stramonium leaves, one part; lobelia leaves, one part; Virginia snake-root, two parts.

Immerse all the above-named ingredients in the solution for one hour, or till soaked through. Now take them out, drain, and dry them (by any process of heat) gradually. Then pulverize or grind them fine, and screen them through a fine wire screen.

I now take half an ounce of gum myrrh, half an ounce of iodide of potassa, and pulverize them together in a mortar till they are as fine as you can get them.

Now add this quantity to each pound of the screened ingredients above mentioned, stir them all together, and finally run the whole through the screen, so as to have all intimately mixed. It is now fit to use.

The manner of using it is to put a portion on a small dish, ignite it with fire, holding the dish so as to inhale the vapor, through the mouth and nose, into the lungs.

Claim.

Having thus clearly described my invention,
What I claim therein as new, and desire to secure by Letters Patent, is—

The herein-named combination of ingredients, or their equivalents, for the purposes and in the manner set forth, substantially as described.

ERASTUS FIELD.

Witnesses:
 FREDK. M. JOY,
 JEREMY S. BEAN.